United States Patent
Hirano

(10) Patent No.: US 6,445,882 B1
(45) Date of Patent: *Sep. 3, 2002

(54) CAMERA WHICH COMPENSATES FOR MOTION BY SETTING THE TIME AT WHICH A MOVABLE MEMBER BEGINS MOVING AND WHICH ADJUSTS THE MOVEMENT OF THE MOVABLE MEMBER FOR MOTION ORIGINATING IN THE CAMERA

(75) Inventor: Shinichi Hirano, Utsunomiya (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,765

(22) Filed: Dec. 20, 1999

Related U.S. Application Data

(63) Continuation of application No. 08/862,362, filed on May 23, 1997, now abandoned, which is a continuation of application No. 08/641,036, filed on Apr. 30, 1996, now abandoned.

(30) Foreign Application Priority Data

May 30, 1995 (JP) .............................................. 7-131624
Jun. 5, 1995 (JP) .............................................. 7-137593

(51) Int. Cl.[7] .............................................. G03B 17/00
(52) U.S. Cl. .......................................... 396/52; 396/55
(58) Field of Search ..................... 348/208; 396/52–55; 359/554

(56) References Cited

U.S. PATENT DOCUMENTS

| | | | |
|---|---|---|---|
| 5,172,150 A | 12/1992 | Teramoto et al. | ............ 354/202 |
| 5,237,365 A | 8/1993 | Miyazawa | .................... 354/456 |
| 5,337,098 A | 8/1994 | Imafuji et al. | ................. 354/70 |
| 5,389,997 A | 2/1995 | Ohishi | .......................... 354/430 |
| 5,444,509 A | 8/1995 | Ohishi | .......................... 354/202 |
| 5,479,236 A | 12/1995 | Tanaka | ........................ 354/430 |
| 5,655,158 A | * 8/1997 | Kai | ............................... 396/55 |
| 6,009,279 A | * 12/1999 | Kai | ............................... 396/55 |
| 6,016,405 A | * 1/2000 | Watanabe et al. | ............. 396/55 |
| 6,064,825 A | * 5/2000 | Onuki | .......................... 396/55 |

* cited by examiner

*Primary Examiner*—Christopher Mahoney

(57) ABSTRACT

A camera which includes a movable member, and a control device for controlling the movable member. The movable member is typically a lens group. The movable member begins moving at an activation time prior to an exposure operation, and is then movable to compensate for motion affecting the camera. The control device controls the movement of the movable member by detecting motion affecting the camera and setting the activation time. The activation time is set so that, at the start of the exposure operation, the speed of movement of the movable member approximates the speed of movement of the detected motion. The camera can also include interrupt signal unit which produces an interrupt signal indicating when motion affecting the camera originates in the camera. The control device then (a) detects motion affecting the camera, (b) controls the movement of the movable member to compensate for the detected motion and, when the interrupt signal indicates that motion affecting the camera originates in the camera, (c) adjusts the movement of the movable member in accordance with the motion originating in the camera.

9 Claims, 12 Drawing Sheets

CONDITIONS SECTION MEMBERSHIP COEFFICIENT U

CONCLUSIONS SECTION MEMBERSHIP COEFFICIENT Q

CAMERA WHICH COMPENSATES FOR MOTION BY SETTING THE TIME AT WHICH A MOVABLE MEMBER BEGINS MOVING AND WHICH ADJUSTS THE MOVEMENT OF THE MOVABLE MEMBER FOR MOTION ORIGINATING IN THE CAMERA

This application is a continuation of application Ser. No. 08/862,362, filed May 23, 1997, now abandoned, which was a continuation of application Ser. No. 08/641,036, filed Apr. 30, 1996, now abandoned.

BACKGROUND OF THE INVENTION

1. Field of the Invention

The present invention relates to a camera having a movable member, such as a lens group, which is movable to compensate for motion affecting the camera due to hand tremors of the photographer. More particularly, the present invention relates to a camera which sets the time at which the movable member begins to move, and which adjusts the movement of the movable member to compensate for motion originating in the camera.

2. Description of the Related Arts

Optical systems project an image onto an image place. Conventional image blur suppression devices suppress, or reduce, blurring of the image. A motion compensation device is a type of image blur suppression device, and compensates for motion incident upon the optical system.

Conventional cameras come equipped with motion compensation devices to compensate for motion incident upon the camera's optical system. Such motion compensation devices are specifically designed to compensate for motion during photography caused by hand tremors of the photographer. For example, Japanese Laid Open Patent Publication No. HEI 2-66535 discloses a motion compensation device for a camera having a single-lens optical system. The motion compensation device detects changes in the angle of the camera's optical axis generated by hand tremors, and uses the detected changes to compensate for motion caused by the hand tremors. In addition, Japanese Laid Open Patent Publication No. HEI 2-183217 discloses a motion compensation device which shifts part of an optical system of an internal focus telescopic lens, to compensate for motion caused by hand tremors.

Generally, a camera has a body device which communicates with a lens device. The camera includes a motion compensation device having a movable member inside the lens device. The lens device also includes a photographic optical system. To activate the motion compensation device, an activation signal is sent from the body device to the lens device. After receiving the activation signal, the motion compensation device moves the movable member to compensate for detected motion.

In a conventional motion compensation device, the movable member of the motion compensation device begins to move after a fixed amount of time from when the lens device receives the activation signal. Regardless of the motion waveform resulting from the hand tremors, the amount of time until the movable member begins to move, is fixed. As a result, delays in motion compensation occur when it is necessary to set the target speed of movement or the target acceleration of movement of the movable member to be relatively large due to a large amount of motion affecting the camera. For example, there is a large amount of motion affecting the camera at the start of film exposure. Therefore, motion compensation is inadequate at the start of film exposure since it is not possible to obtain the appropriate speed of movement of the movable member. As a result, highly accurate motion compensation control cannot be performed.

To obtain the appropriate speed of movement of the movable member at the start of film exposure, it is conceivable that the fixed amount of time to start movement of the movable member could be set to begin earlier. However, when movement of the movable member is started relatively early with respect to the start of film exposure, the movable member moves to the edge of its motion range at the start of film exposure. As a result, it is impossible to effectively use the entire motion range of the movable member, and highly accurate motion compensation control cannot be performed.

Moreover, motion compensation devices as disclosed in Japanese Patent Publications Nos. HEI 2-66535 and 2-183217 will be effected by additional problems when used in a single-lens reflex camera. In a single-lens reflex camera, brief, large amplitude motion occurs in the body device (to which the lens device is attached) due to mirror raising shock, shutter blade running vibration, drive vibration of the film winding motor, autofocus (AF) motor drive vibration and electrical noise. The motion compensation device will follow this brief, large amplitude motion originating in the body device. As a result, the motion compensation device cannot accurately follow and detect motion caused by hand tremors. Therefore, the motion compensation device cannot perform highly accurate motion compensation with respect to motion caused by hand tremors.

SUMMARY OF THE INVENTION

Accordingly, it is an object of the present invention to provide a camera having a motion compensation device which performs highly accurate motion compensation with respect to motion caused by hand tremors.

It is an additional object of the present invention to provide a camera having a motion compensation device which moves a movable member to compensate for motion on the camera, and optimizes the time at which movement of the movable member is started.

Objects of the present invention are achieved by providing an optical device, such as a camera, which performs an exposure operation to expose a recording medium. The optical device includes a movable member, and a control device for controlling the movable member. The movable member begins moving at an activation time prior to the exposure operation, and is then movable to compensate for motion affecting the optical device. The control device controls the movement of the movable member by detecting motion affecting the optical device and setting the activation time. The activation time is set so that, at the start of the exposure operation, the speed of movement of the movable member approximates the speed of movement of the detected motion. The control device can control the movement of the movable member by setting a target speed and/or a target acceleration of the movable member, so that, at the start of the exposure operation, the speed of the movable member approximates the speed of the detected motion. Further, the control device can detect motion by detecting the speed, acceleration and/or displacement of motion affecting the optical device.

Further, objects of the present invention are achieved by providing an optical device, such as a camera, which includes a movable member, an interrupt signal unit and a control device.

The movable member is movable to compensate for motion affecting the optical device. The interrupt signal unit produces an interrupt signal indicating when motion affecting the optical device originates in the optical device. The control device (a) detects motion affecting the optical device, (b) controls the movement of the movable member to compensate for the detected motion and, when the interrupt signal indicates that motion affecting the optical device originates in the optical device, (c) adjusts the movement of the movable member in accordance with the motion originating in the optical device. Further, when the interrupt signal indicates that motion affecting the optical device originates in the optical device, the control device controls the movable member to continue moving at the speed at which the movable member was moving immediately before the interrupt signal indicated that motion affecting the optical device originated in the optical device.

In addition, objects of the present invention are achieved by providing the optical device with a control device which (a) detects motion affecting the optical device, (b) controls the movement of the movable member to compensate for the detected motion and, when motion affecting the optical device originates in the optical device, (c) controls the movement of the movable member so that the movable member continues to move at the speed of movement at which the movable member was moving immediately before the motion affecting the optical device originated in the optical device.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
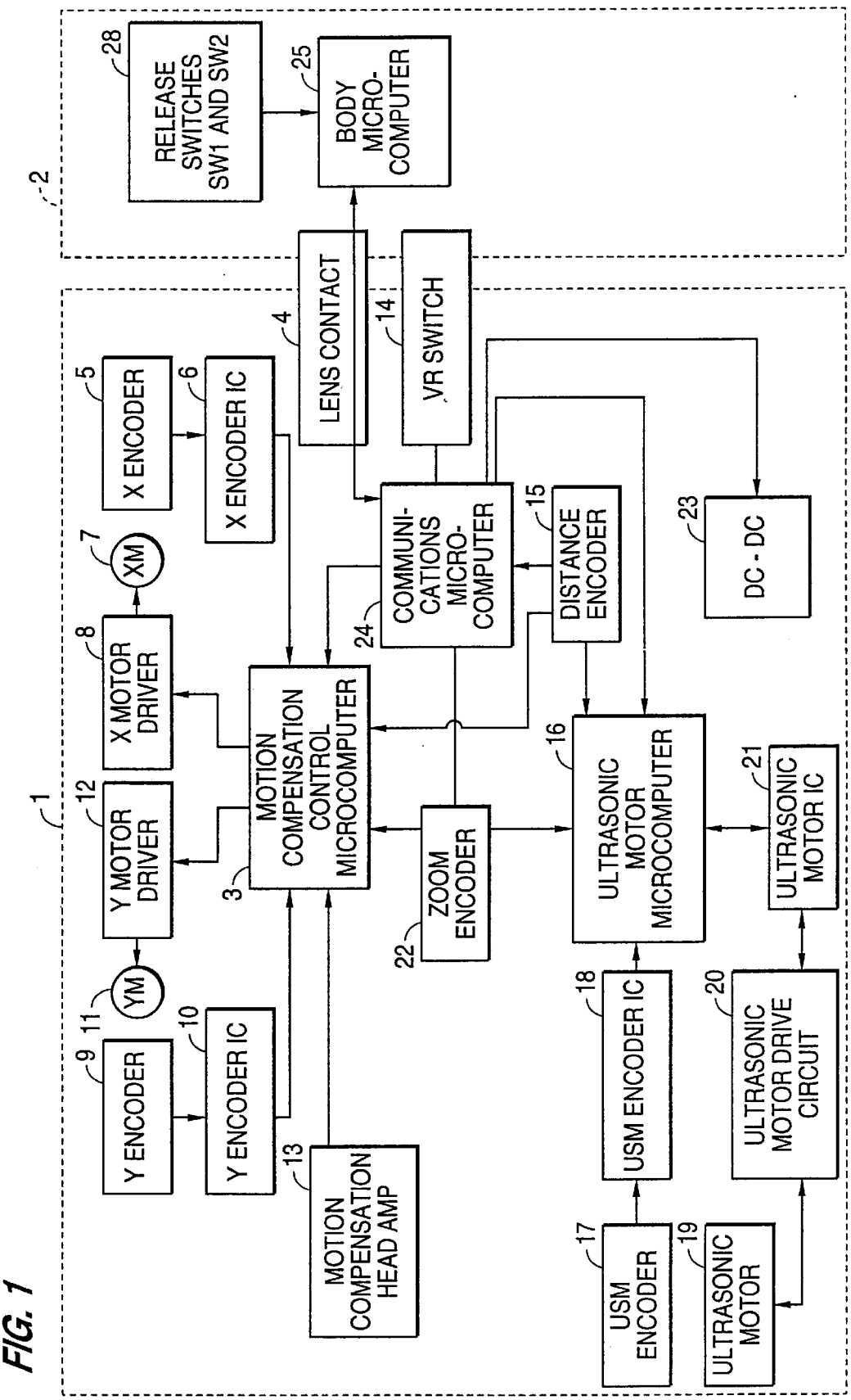
FIG. 1 is a block diagram illustrating a camera having a motion compensation device, according to an embodiment of the present invention.

Reference will now be made in detail to the present preferred embodiments of the present invention, examples of which are illustrated in the accompanying drawings, wherein like reference numerals refer to like elements throughout.

Figure 2:
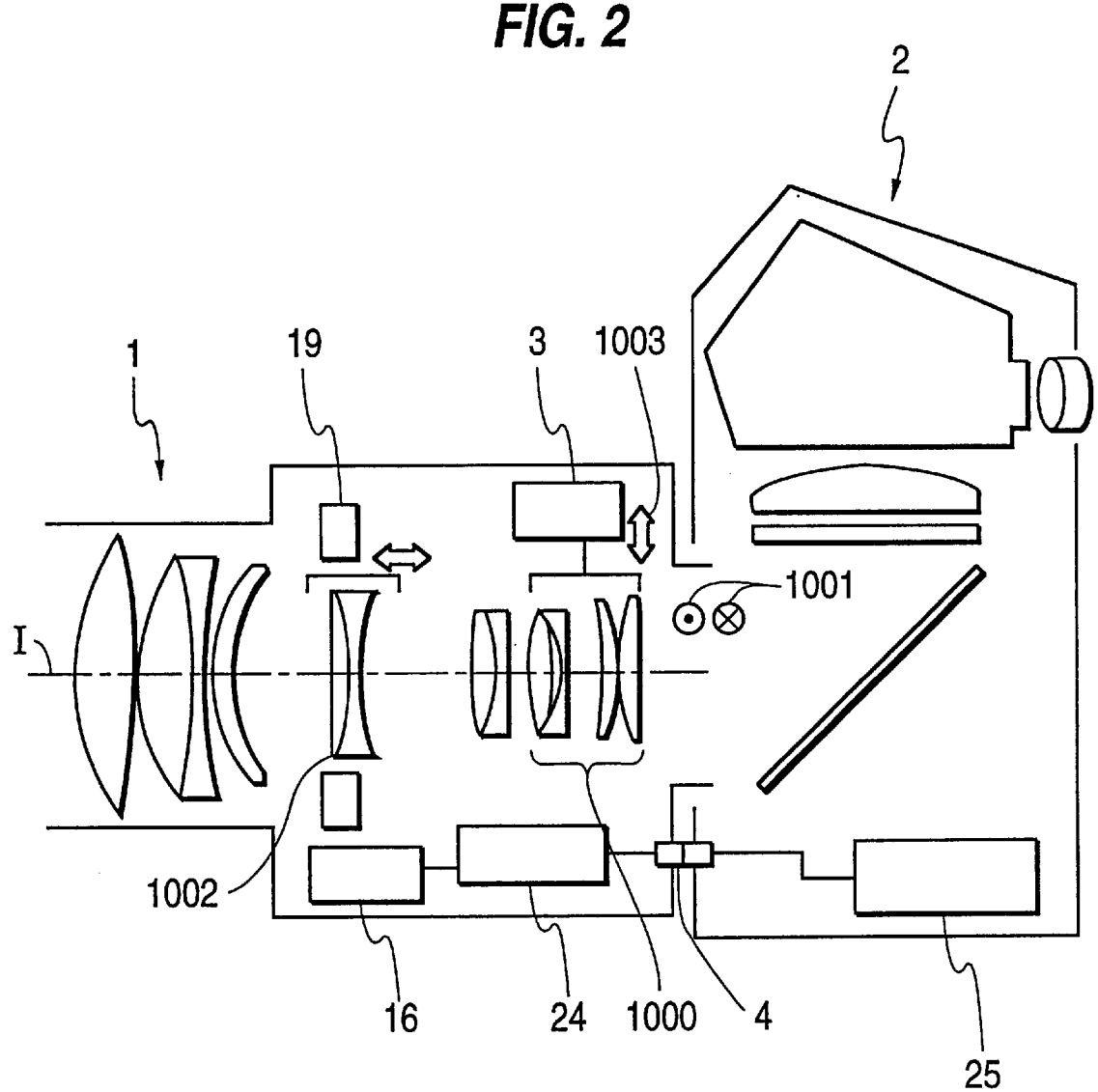
FIG. 2 is a cross-sectional diagram illustrating a camera having a motion compensation device, according to an embodiment of the present invention.

FIG. 1 is a block diagram illustrating a camera having a motion compensation device, according to an embodiment of the present invention, and FIG. 2 is a cross-sectional diagram illustrating a camera having a motion compensation device, according to an embodiment of the present invention.

Referring now to FIGS. 1 and 2, a camera includes a lens device 1 and a body device 2 attached together. Various microprocessors reside in lens device 1 and body device 2. For example, lens device 1 includes a motion compensation control microcomputer 3, an ultrasonic motor microcomputer 16 and a communications microcomputer 24. Body device 2 includes a body microcomputer 25. A lens contact 4 is an electrical contact group for transferring signals between lens device 1 and body device 2, and is connected to communications microcomputer 24 and body microcomputer 25. Communications microcomputer 24 controls the transfer of signals between lens device 1 and the body device 2, and transmits commands to other microcomputers (such as motion compensation control microcomputer 3 and ultrasonic motor microcomputer 16) inside lens device 1.

A lens group 1000 (see FIG. 2) is a movable member which is shifted in an x-axis direction 1001 and a y-axis direction 1003, both perpendicular to the optical axis I of the camera, to compensate for motion affecting the camera. Thus, lens group 1000 can also be referred to as a "compensation lens" which is shifted, or moved, to compensate for motion or vibration affecting the camera. A focusing optical system 1002 (see FIG. 2) is shifted in the optical axis direction to focus the camera by changing the focal point of lens device 1.

An x encoder 5 detects the amount of movement of lens group 1000 in the x-axis direction, and provides a corresponding output to an x encoder IC 6. x encoder IC 6 converts the amount of movement of lens group 1000 in the x-axis direction into electrical signals, and provides a corresponding output to motion compensation control microcomputer 3. An x-axis motor driver (X Motor Driver) 8 drives an x-axis motor (XM) 7 to move lens group 1000 in the x-axis direction. Therefore, x-axis motor 7 and x-axis motor driver 8 together operate as motion compensation drivers for shifting the lens group 1000 in the x-axis direction.

Similarly, a y encoder 9 detects the amount of movement of lens group 1000 in the y-axis direction, and provides a corresponding output to a y encoder IC 10. y encoder IC 10 converts the amount of movement of lens group 1000 in the y-axis direction into electrical signals, and provides a corresponding output to motion compensation control microcomputer 3. A y-axis motor driver (Y Motor Driver) 12 drives a y-axis motor (YM) 7 to move lens group 1000 in the y-axis direction. Therefore, y-axis motor 11 and y-axis motor driver 12 together operate as motion compensation drivers for shifting the lens group 1000 in the y-axis direction.

A distance encoder 15 detects the focus position, converts the detected focus position into electrical signals, and provides the electrical signals to motion compensation control microcomputer 3, ultrasonic motor microcomputer 16 and communications microcomputer 24. Ultrasonic motor microcomputer 16 then controls an ultrasonic motor 19 through an ultrasonic motor IC 21 and an ultrasonic motor drive circuit 20, to drive focusing optical system 1002.

An ultrasonic motor (USM) encoder 17 detects the amount of movement of ultrasonic motor 19, and provides a corresponding output to an USM encoder IC 18. USM encoder IC 18 converts the amount of movement of ultrasonic motor 19 into electrical signals, and provides the electrical signals to ultrasonic motor microcomputer 16.

Ultrasonic motor drive circuit 20 produces a specific frequency drive signal for driving ultrasonic motor 19, and generates two drive signals having a 90⁰ phase difference with each other. Ultrasonic motor IC 21 functions as an interface between ultrasonic motor microcomputer 16 and ultrasonic motor drive circuit 20.

A zoom encoder 22 detects the lens focal length position, converts the detected position into electrical signals, and provides a corresponding output signal to motion compensation control microcomputer 3, ultrasonic motor microcomputer 16 and communications microcomputer 24. Therefore, as described above, x encoder 5, y encoder 9, distance encoder 15 and zoom encoder 22 are encoders for determining optical system position information.

A motion compensation head amp 13 detects the amount of motion of lens device 2, converts the detected motion into electrical signals, and provides a corresponding output signal to motion compensation control microcomputer 3. Motion compensation head amp 13 can detect motion by detecting either speed, acceleration and/or, if necessary, the displacement of motion. Motion compensation head amp 13 can be, for example, an angle sensor.

To set the time at which lens group 1000 begins to move to compensate for motion, motion compensation control microcomputer 3 controls x-axis drive motor 7, x-axis motor driver 8, y-axis drive motor 11 and y-axis motor driver 12 in accordance with control signals from body microcomputer 25 and the optical system position information determined by x encoder 5, y encoder 9, distance encoder 15 and zoom encoder 22.

A VR switch 14 is a switch which turns motion compensation drive ON and OFF, and switches between a motion compensation mode A and a motion compensation mode B. For example, motion compensation mode A performs rough control of motion compensation during viewfinder image motion following the start of photographic preparations, and motion compensation mode B performs fine control of motion compensation during actual exposure.

A DC—DC converter 23 supplies a DC voltage which is stabilized with respect to fluctuations in the voltage of a battery (not illustrated) supplying power to the camera. DC—DC converter 23 is controlled by communications microcomputer 24.

A release switch 28 is attached to body device 2 and can be pushed by a photographer to a half-push position and a full-push position. Release switch includes a half-push switch SW1 for starting photographic preparation operations (such as rangefinding and photometry) when the release switch 28 is pushed to the half-push position, and a full-push switch SW2 for initiating exposure control when release switch 28 is pushed to the full-push position.

Motion compensation control microcomputer 3, motion compensation head amp 13, y-axis drive motor 11, y-axis motor driver 12, y encoder 9, y encoder IC 10, x-axis drive motor 7, x-axis motor driver 8, x encoder 5 and x encoder IC 6 together function as a control device to control the movement of a movable member (lens group 1000), to compensate for motion affecting the camera.

Figure 3:
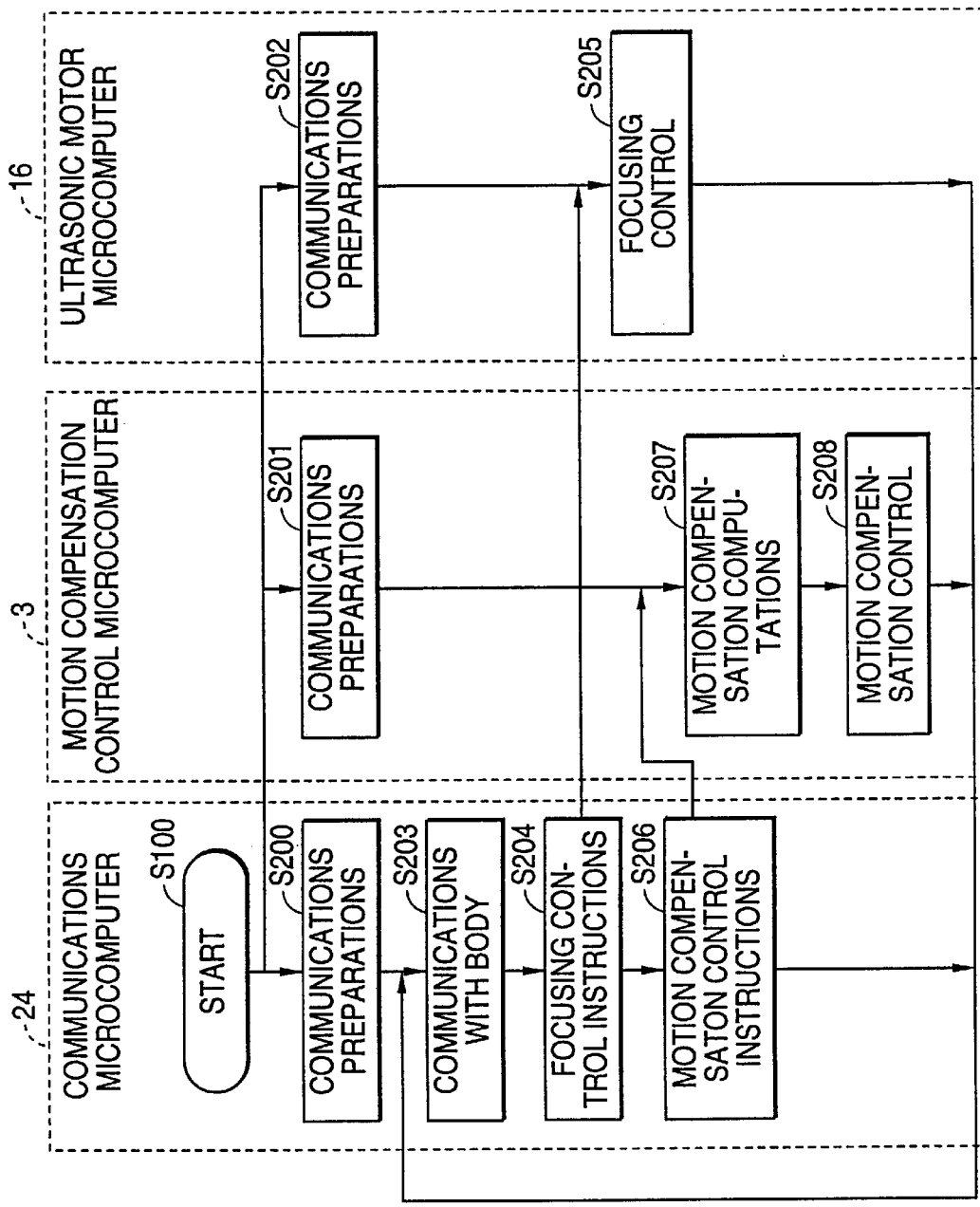
FIG. 3 is a flow chart illustrating the processing sequence of a camera having a motion compensation device, according to an embodiment of the present invention.

FIG. 3 is a flow chart illustrating the processing sequence of a camera having a motion compensation device, according to an embodiment of the present invention. More specifically, FIG. 3. illustrates the various processes as performed by communications microcomputer 24, motion compensation control microcomputer 3 and ultrasonic motor microcomputer 16.

Referring now to FIG. 3, the process starts in step S100. From step S100, the process moves to steps S200, S201 and S202. which are simultaneously performed. More specifically, in step S200, communications, microcomputer 24 performs communications preparations. Simultaneously, motion compensation microcomputer 3 performs communications preparations in S201, and ultrasonic motor microcomputer 16 performs communications preparations in S202. From step S201, the processing of motion compensation control microcomputer 3 moves to step S207. From step S202, the processing of ultrasonic motor microcomputer 16 moves to step S205.

From step S200 the processing of communications microcomputer 24 moves to step S203, where communications microcomputer 24 communicates with body microcomputer 25 via lens contact 4. From step S203, the processing of communications microcomputer 24 moves to step S204, where communications microcomputer 24 transmits focus control instructions (based on instructions received from body microcomputer 25 in step S203) to ultrasonic motor microcomputer 16. From step S204, the processing of communications microcomputer 24 moves to step S206, where motion compensation control instructions (based on instructions received from body microcomputer 25 in step S203) are transmitted to motion compensation control microcomputer 3.

After communications microcomputer performs step S204, the process moves to step S205, where ultrasonic motor microcomputer 16 performs focusing control based on the information of the zoom encoder 22 and the distance encoder 15. After communications microcomputer performs step S206, the process moves to step S207, where motion compensation control microcomputer 3 performs motion compensation computations. Such motion compensation computations can include, for example, setting the start time at which the lens group 1000 begins to move, determining the target speed of movement of lens group 1000, and determining the target acceleration of movement of the lens group 1000.

From step S207, the processing of motion compensation control microcomputer moves to step S208, where motion compensation control microcomputer 3 performs motion compensation control based on the motion compensation computation results performed in step S207.

Motion compensation control can be performed in accordance with many different computational methods. For example, motion compensation can be performed in accordance with fuzzy logic rules. More specifically, the control time output for motion compensation control can be obtained by the following fuzzy rules, where M, U and Q represent fuzzy logic membership coefficients.

Figure 4:
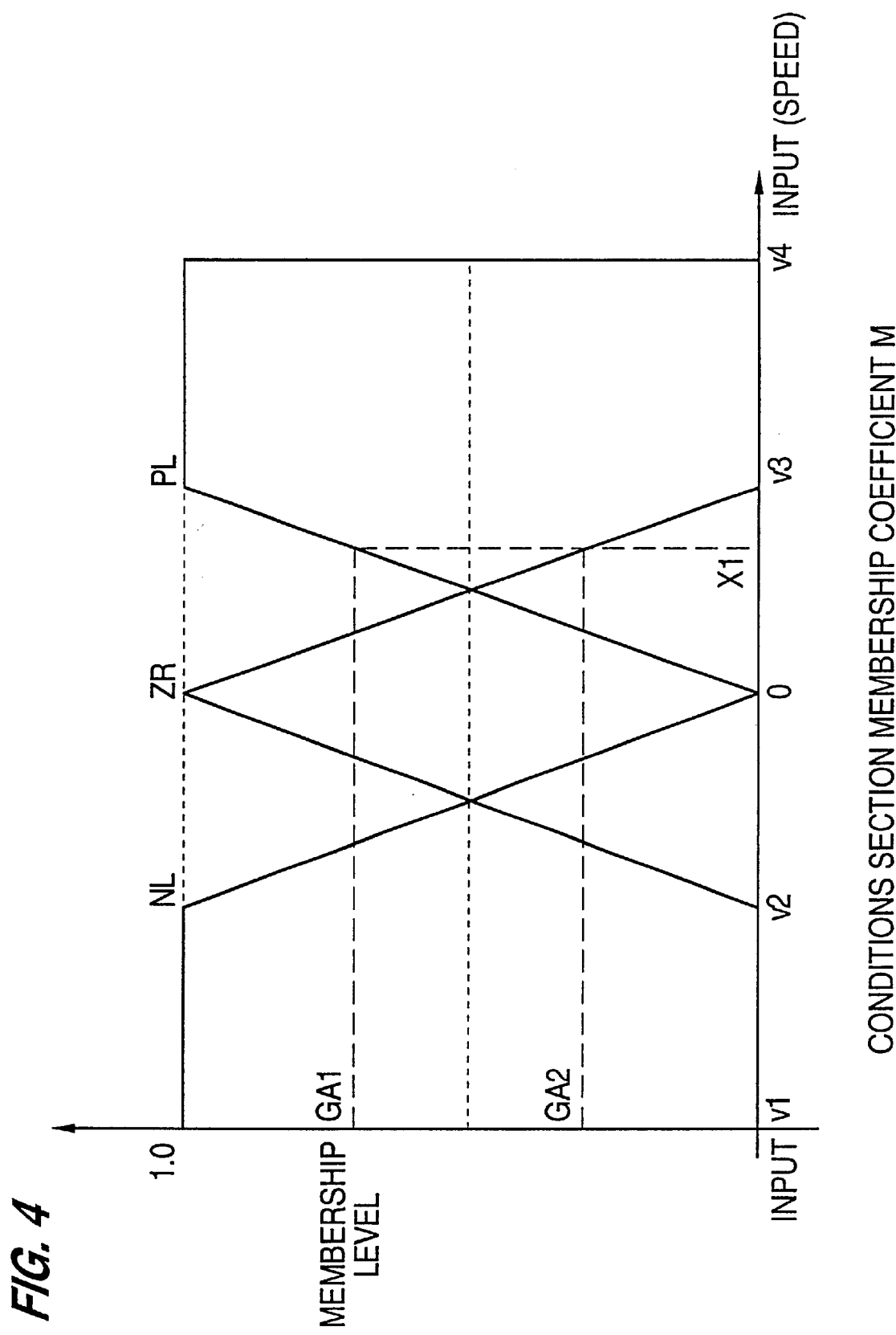
FIG. 4 is graph illustrating a fuzzy logic membership coefficient M showing the membership level when the speed is used as a fuzzy logic input, where the speed is from the condition section of the processing coefficient fuzzy rules, according to an embodiment of the present invention.

Rule 1: if M is PL or U is PL then Q is PL
Rule 2: if M is ZR then Q is PS
Rule 3: if M is NL or U is NL then Q is PL FIG. 4 is graph illustrating a fuzzy logic membership coefficient M showing the membership level when the speed is used as a fuzzy logic input, where the speed is from the condition section of the processing coefficient fuzzy rules of a control device attached to the camera, according to an embodiment of the present invention.

Figure 7:
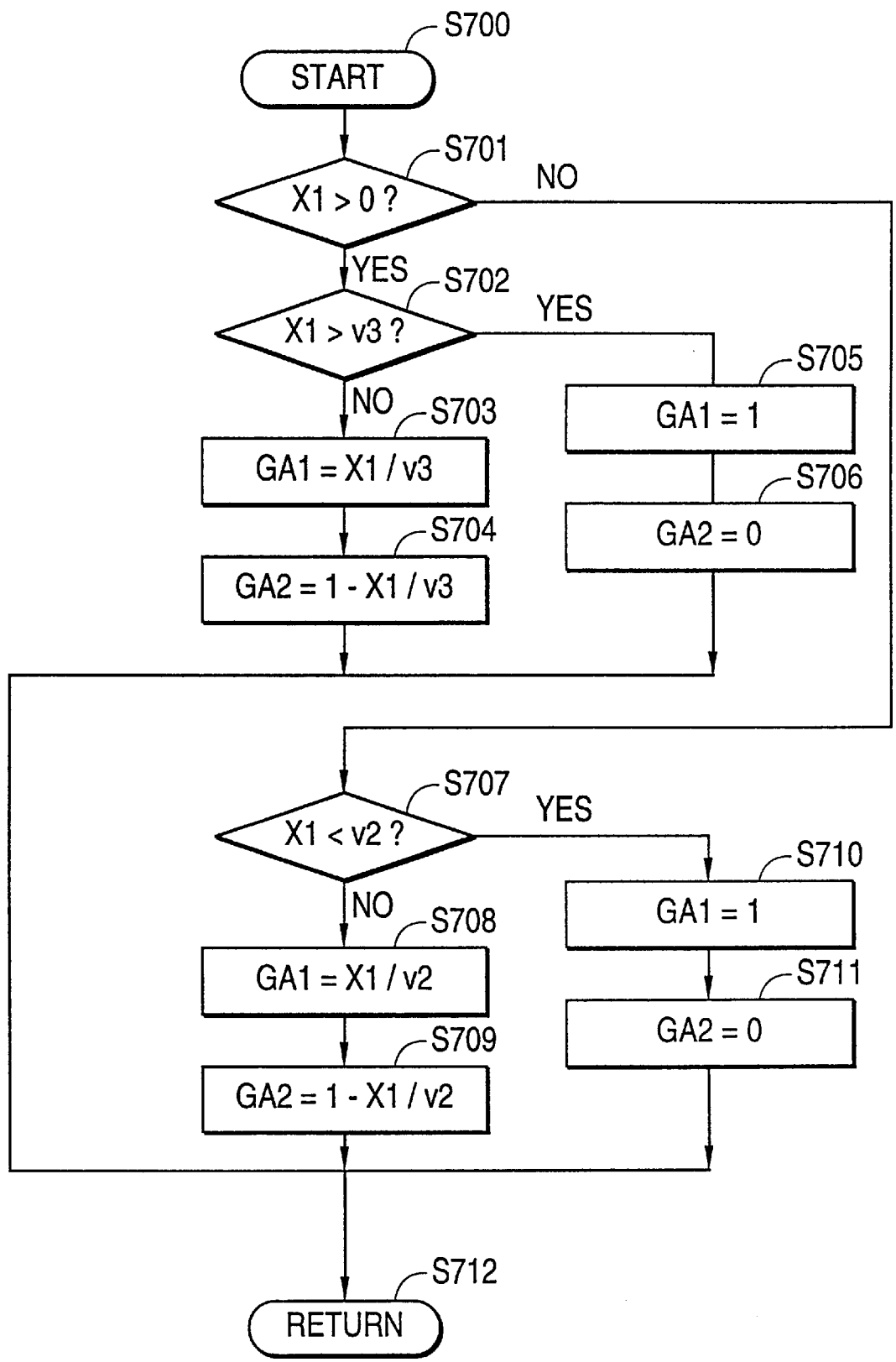
FIG. 7 is a flow chart illustrating the computation process of the fuzzy rule conditions section membership coefficient M illustrated in FIG. 4, according to an embodiment of the present invention.

FIG. 7 is a flow chart illustrating the computation process of the fuzzy rule conditions section membership coefficient M illustrated in FIG. 4, according to an embodiment of the present invention. Referring now to FIG. 7, the process starts in step S700. From step S700, the process moves to step S701, where a determination is made as to whether a control target speed X1 computed from the output waveform of motion compensation head amp 13 is larger than zero (0). If the control target speed X1 is larger than zero (0) in step S701, the process moves to step S702. If the control target speed X1 is not larger than zero (0) in step S701, the process jumps to step S707.

In step S702, a determination is made as to whether the control target speed XI is larger than speed v3. If the control target speed XI is larger than speed v3 in step S702, the process moves to step S705. If the control target speed XI is not larger than speed v3 in step S702, the process moves to step S703.

In S703, the membership level GA1=X1/v3, resulting from PL, is computed. From step S703, the process moves to step S704, where the membership level GA2=1−X1/v3, resulting from ZR, is computed. From step S704, the process moves to step S712 and ends.

In S705, the membership level GA1 resulting from PL is considered to be equal to one (1). From step S705, the process moves to step S706, where the membership level GA2 resulting from ZR is considered to be equal to zero (0). From step S706, the process moves to step S712 and ends.

In S707, a determination is made as to whether the control target speed X1 is smaller than speed v2. If the control target speed X1 is smaller than speed v2, the process moves to step S710. If the control target speed X1 is not smaller than speed v2, the process moves to step S708.

In S708, the membership level GA1=X1/v2, resulting from NL, is computed. From step S708, the process moves to step S709, where the membership level GA2=1−X1/v2, resulting from ZR, is computed. From step S709, the process moves to step S712 and ends.

In S710, the membership level GA1 resulting from NL is considered to be equal to one (1). From step S710, the process moves to step S711, where the membership level GA2 resulting from ZR is considered to equal to zero (0). From step S711, the process moves to step S712 and ends.

Figure 5:
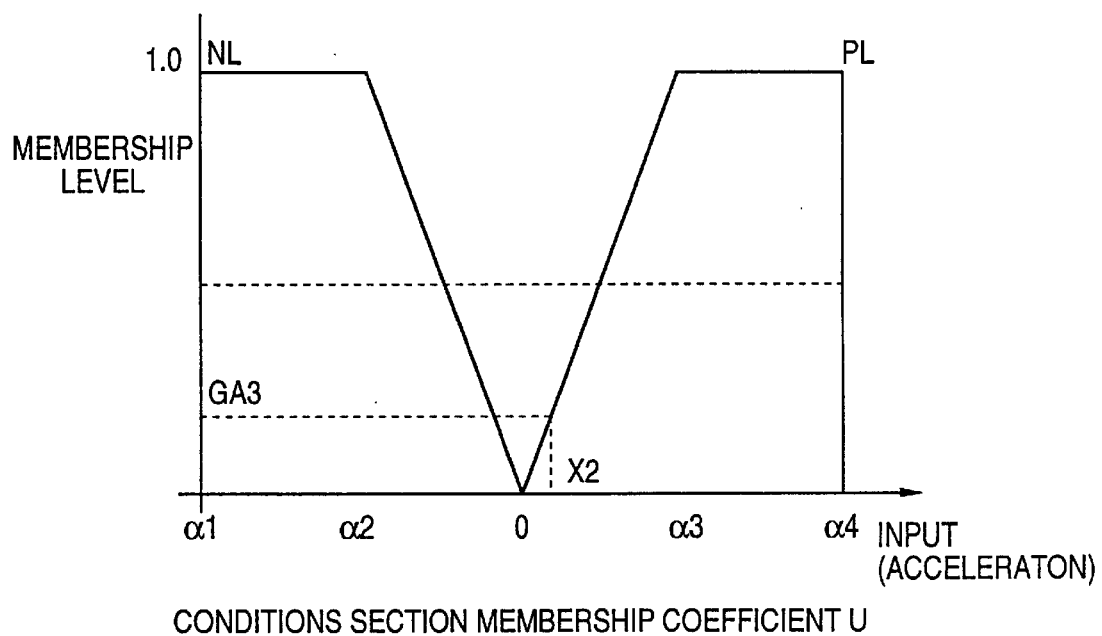
FIG. 5 is a graph illustrating a fuzzy logic membership coefficient U showing the membership level when the acceleration is used as a fuzzy logic input, where the acceleration is from the conditions section of the processing coefficient fuzzy rules, according to an embodiment of the present invention.

FIG. 5 is a graph illustrating a fuzzy logic membership coefficient U showing the membership level when the acceleration is used as a fuzzy logic input, where the acceleration is from the conditions section of the processing coefficient fuzzy rules, according to an embodiment of the present invention.

Figure 8:
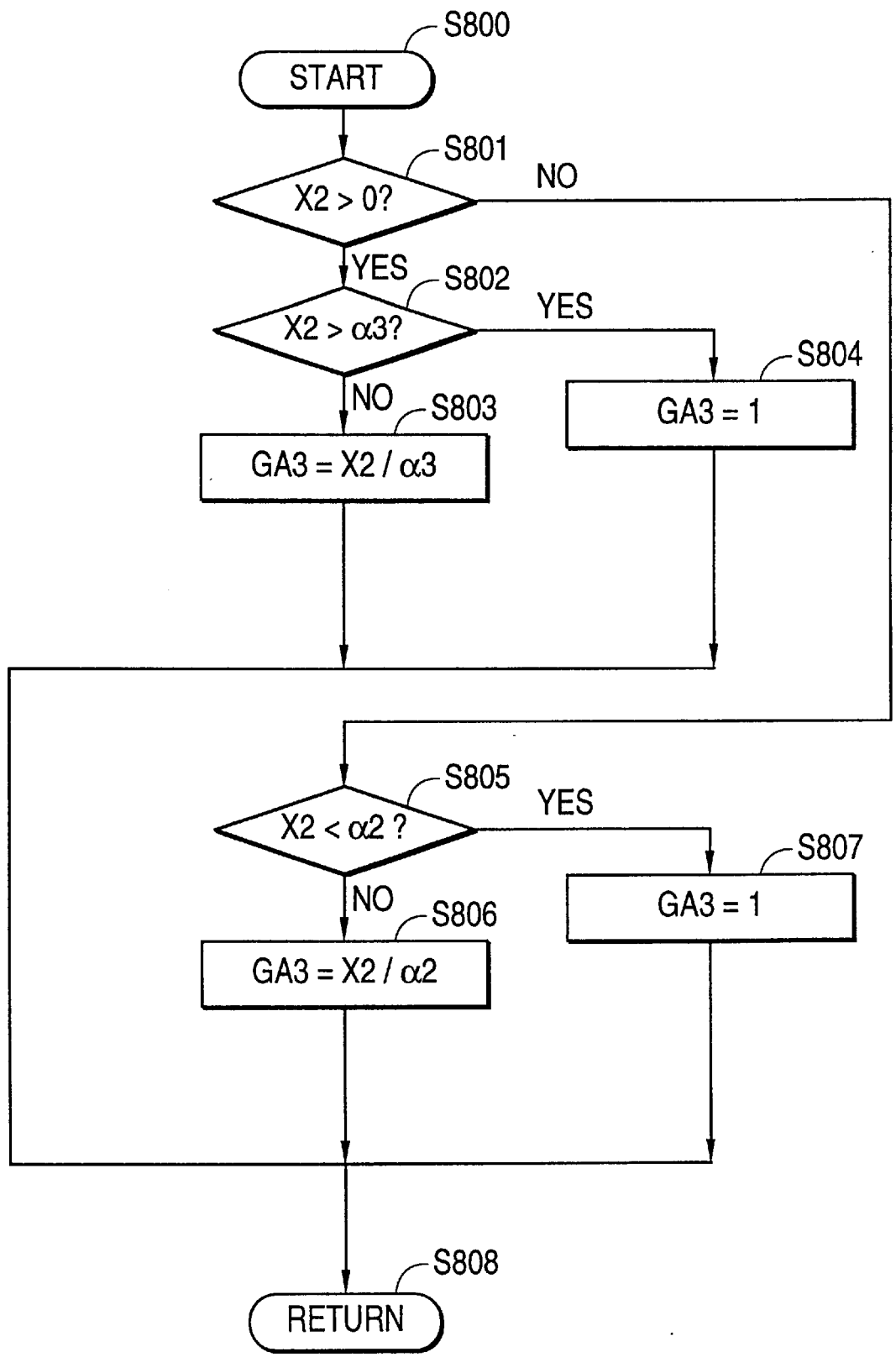
FIG. 8 is a flow chart illustrating the computation process of the fuzzy rule conditions section membership coefficient U illustrated in FIG. 5, according to an embodiment of the present invention.

FIG. 8 is a flow chart illustrating the computation process of the fuzzy rule conditions section membership coefficient U illustrated in FIG. 5, according to an embodiment of the present invention.

Referring now to FIG. 8, the process starts in step S800. From step S800, the process moves to step S801, where a determination is made as to whether a control target acceleration X2 computed from the output waveform of the motion compensation head amp 13 is larger than zero (0). If the control target acceleration X2 is larger than zero (0) in step S801, the process moves to step S802. If the control target acceleration X2 is not larger than zero (0) in step S801, the process jumps to step S805.

In step S802, a determination is made as to whether the control target acceleration X2 is larger than acceleration α3. If the control target acceleration X2 is larger than acceleration α3 in step S802, the process moves to step S804. If the control target acceleration X2 is not larger than acceleration α3 in step S802, the process moves to step S803.

In S803, the membership level GA3=X2/α3, resulting from PL, is computed. From step S803, the process moves to step S808 and ends. In S804, the membership level GA3 resulting from PL is considered to be equal to one (1). From step S804, the process moves to step S808 and ends.

In S805, a determination is made as to whether the control target acceleration X2 is smaller than acceleration α2. If the control target acceleration X2 is smaller than acceleration α2 in step S805, the process moves to step S807. If the control target acceleration X2 is not smaller than acceleration α2 in step S805, the process moves to step S806.

In S806, the membership level GA3=X2/α2, resulting from NL, is computed. From step S806, the process moves to step S808 and ends.

In S807, the membership level GA3 resulting from NL is considered to be equal to one (1). From step S807, the process moves to step S808 and ends.

Figure 6:
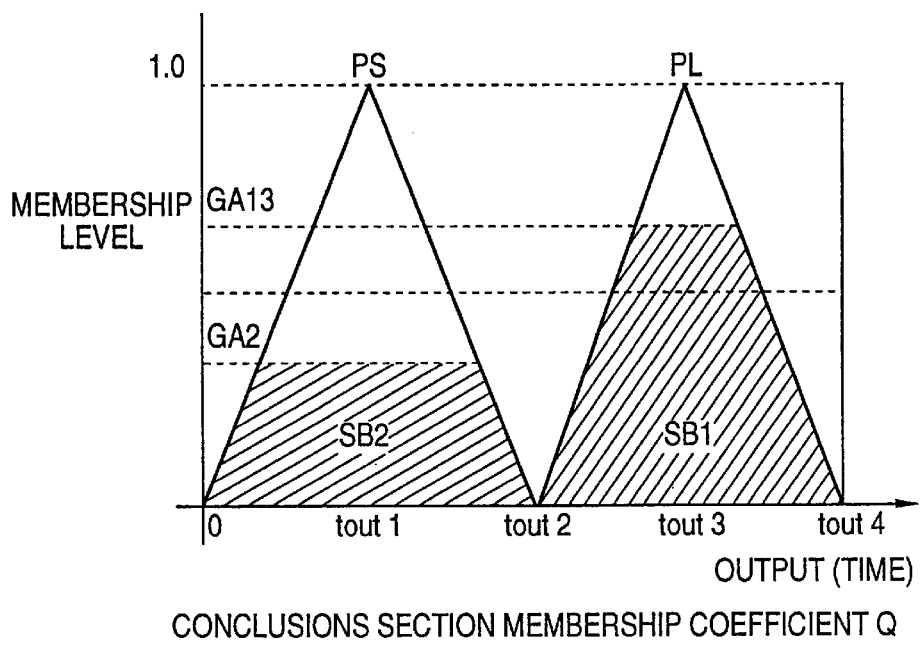
FIG. 6 is a graph illustrating a fuzzy logic membership coefficient Q showing the control time output of the fuzzy rules conclusions section with respect to the membership level of the processing coefficients, according to an embodiment of the present invention.

FIG. 6 is a graph illustrating a fuzzy logic membership coefficient Q showing the control time output of the fuzzy rules conclusions section with respect to the membership level of the processing coefficients, according to an embodiment of the present invention.

Figure 9:
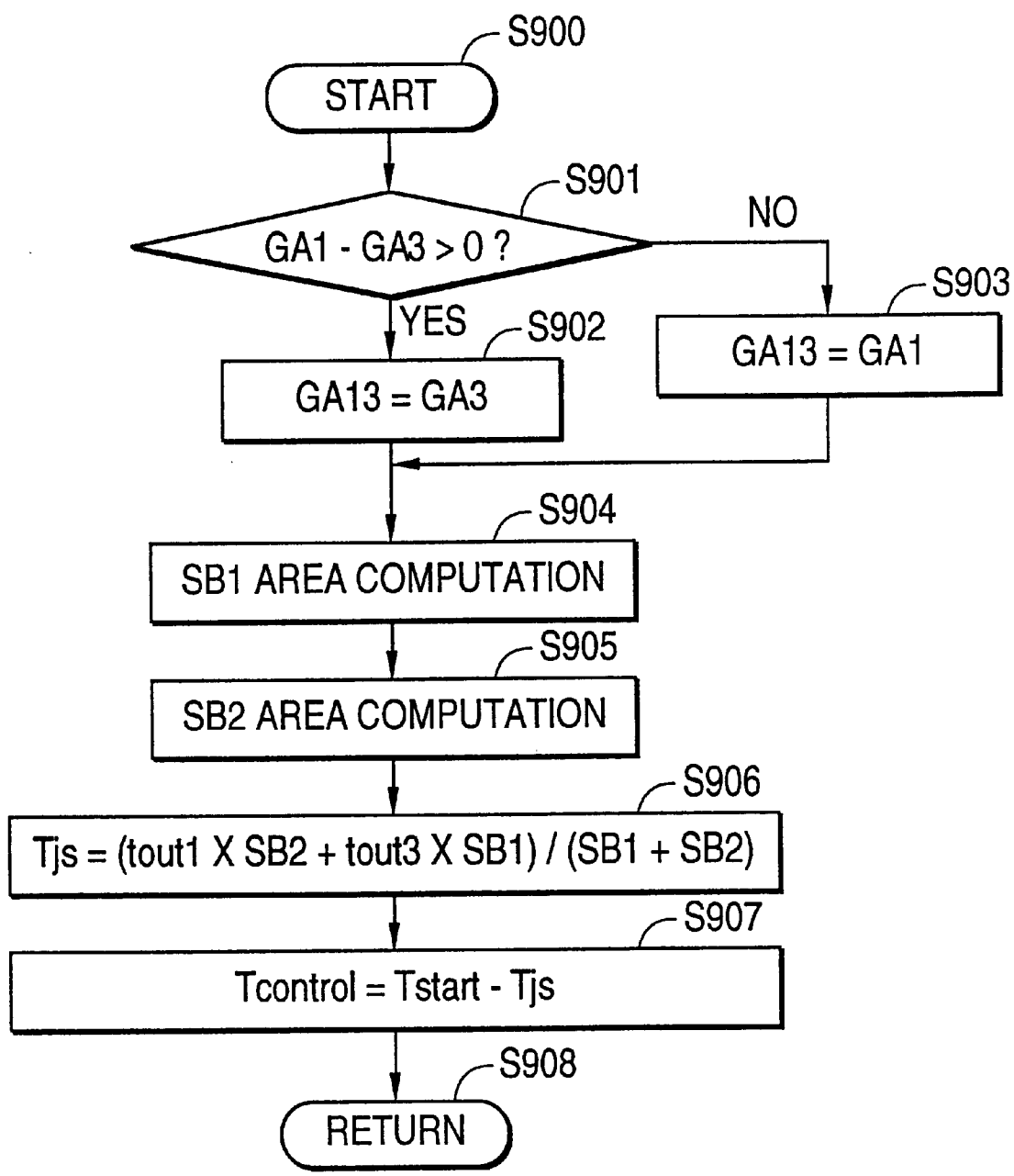
FIG. 9 is a flow chart illustrating the computation process resulting from the fuzzy rule conclusions section membership coefficient Q illustrated in FIG. 6, according to an embodiment of the present invention.

FIG. 9 is a flow chart illustrating the computation process resulting from the fuzzy rule conclusions section membership coefficient Q illustrated in FIG. 6, according to an embodiment of the present invention.

Referring now to FIG. 9, the process starts in step S900. From step S900, the process moves to step S901, where a determination is made as to whether (GA1−GA3) is larger than zero (0). If (GA1−GA3) is larger than zero (0) in step S901, the process moves to step S902. If (GA1−GA3) is not larger than zero (0) in step S901, the process moves to step S903.

In S902, the membership level GA13 resulting from the fuzzy rule conditions section logical sum computations of Rule 1 or Rule 3 is considered to be equal to GA3. From step S902, the process moves to step S904.

In S903, the membership level GA13 resulting from the fuzzy rule conditions section logical sum computations of Rule 1 or Rule 3 is considered to be equal to GA1. From step S903, the process moves to step S904.

In step S904, the area of range SB1 (see FIG. 6), enclosed by fuzzy rule conclusions section membership coefficients PL and GA13, is computed. From step S904, the process moves to step S905, where the area of range SB2 (see FIG. 6), enclosed by fuzzy rule conclusions section membership coefficients PS and GA2, is computed. From step S905, the process moves to step S906, where the control time output, $T_{js}$, is computed as:

$$T_{js} = (tout1 \times SB2 + tout3 \times SB1)/(SB1+SB2)$$

by a gravity center method.

From step S906, the process moves to step S907, where the motion compensation control start time, Tcontrol, is computed as:

$$T\text{control} = T\text{start} - T_{js}$$

from the motion compensation start time Tstart sent from body device 2 and the control time output $T_{js}$ computed in S906. From step S907, the process moves to a return at step S908.

Figure 10:
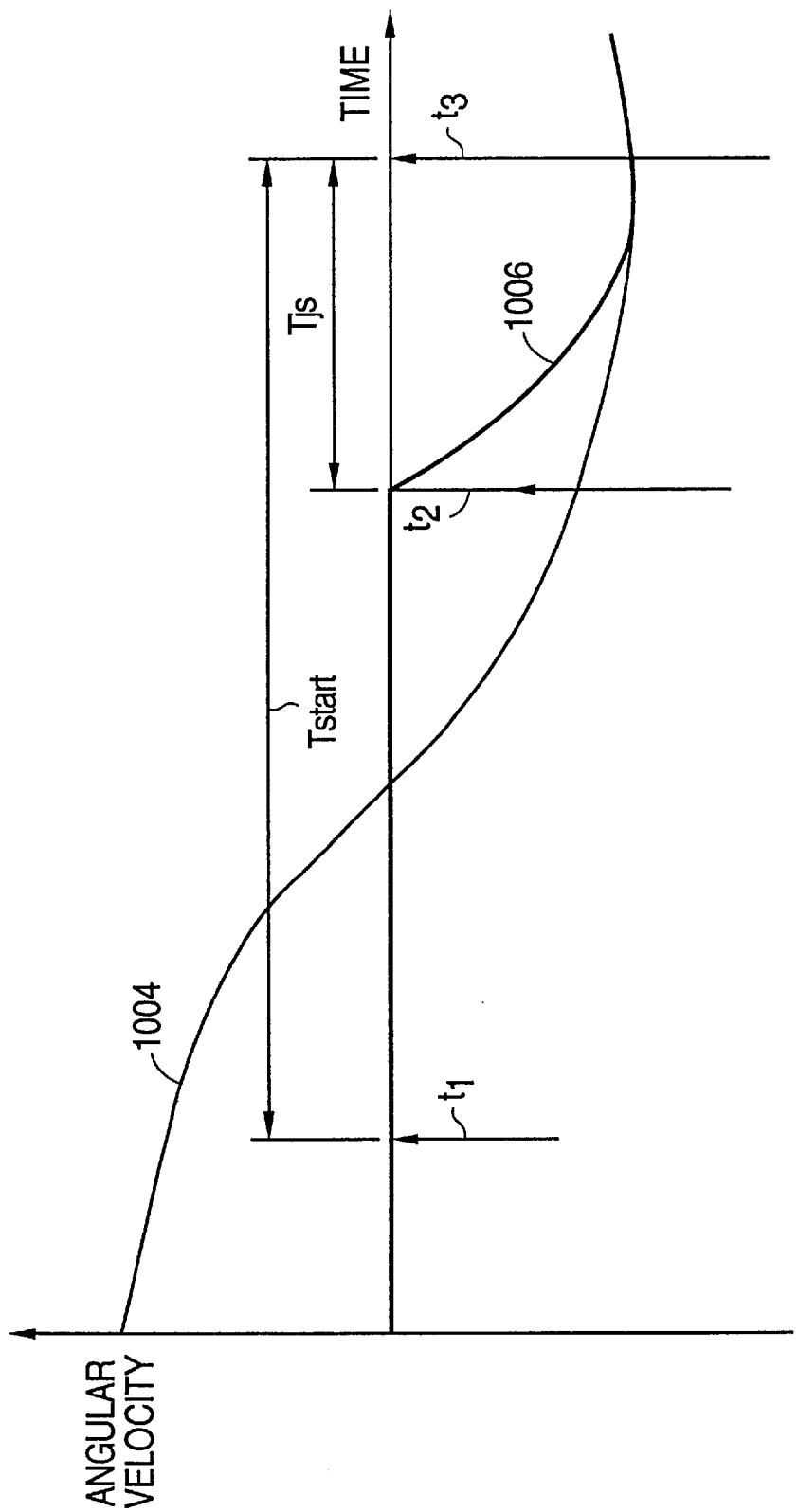
FIG. 10 is a time-angular velocity graph illustrating the start of movement of a movable member in relation to the start of exposure, when the control target speed and the control target acceleration are both large, according to an embodiment of the present invention.

FIG. 10 is a time-angular velocity graph illustrating the start of movement of lens group 1000 in relation to the start of exposure, when the control target speed and the control target acceleration are both large, according to an embodiment of the present invention. More specifically, FIG. 10 is a time-angular velocity graph illustrating relative timing from the reception of a motion compensation command output (that is, the time from a signal received by lens device 1 from body device 2) to the start of exposure control, in the case where the control target speed and the control target acceleration are both large.

In FIG. 10, a curve 1004 represents the control target speed and a curve 1006 represents the control speed. Moreover, in FIG. 10, $t_1$ is the time at which a motion compensation command is received by lens device 1, $t_2$ is the time at which lens group 1000 begins to move, $t_3$ is the time at which exposure control is started, and the time Tstart is the time until exposure control is started from the time when an activation signal is received by lens device 1 from body device 2. The value of Tstart is received at the same time that the activation signal is received. Therefore, Tstart equals time $t_3$–time $t_1$.

As illustrated in FIG. 10, the time (time $t_2$–time $t_1$) from the receipt of an activation signal (time $t_1$) to the start of movement of lens group 1000 (time $t_2$) is computed from (a) the time Tstart (time $t_3$–time $t_1$) and (b) the previously determined computation result $T_{js}$ (time $t_3$–time $t_2$).

As illustrated by FIG. 10, the time ($t_2$) at which lens group 1000 begins to move is set at a time which is considerably earlier than the time ($t_3$) at which exposure control is started. As a result, the motion control target speed 1004 and the control speed 1006 will match at time $t_3$.

Figure 11:
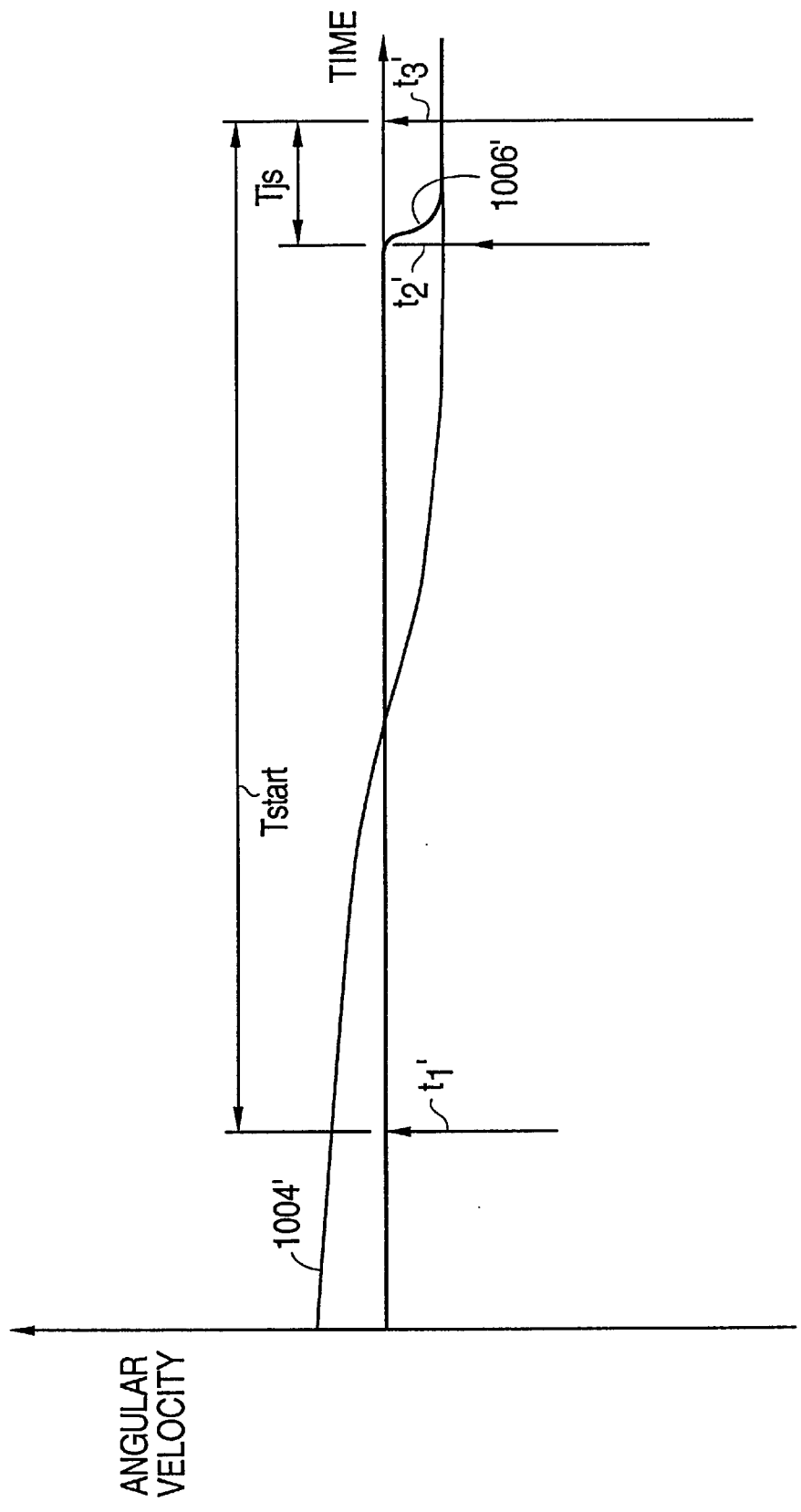
FIG. 11 is a time-angular velocity graph illustrating the start of movement of a movable member in relation to the start of exposure control, when the control target speed and the control target acceleration are both small, according to an embodiment of the present invention.

FIG. 11 is a time-angular velocity graph illustrating the start of movement of lens group 1000 in relation to the start of exposure control, when the control target speed and the control target acceleration are both small, according to an embodiment of the present invention. More specifically, FIG. 11 is a time-angular velocity graph illustrating the relative timing from the receipt of an activation signal by lens device 1 from body device 2, to the start of exposure control, in the case where the control target speed and the control target acceleration are both small.

In FIG. 11, a curve 1004' represents the control target speed and a curve 1006' represents the control speed. Moreover, in FIG. 10, $t_1'$ is the time at which an activation signal is received, $t_2'$ is the time at which movement of lens group 1000 is started, $t_3'$ is the time at which exposure control is started, and the time Tstart equals time $t_3'$–time $t_1'$.

As illustrated in FIG. 11, the time (time $t_2'$–time $t_1'$) from the receipt of the activation signal (time $t_1$) to the start of movement of lens group 1000 (time $t_2'$) is computed from (a) the time Tstart (time $t_3'$–time $t_1'$) and (b) the previously computed computation result $T_{js}$ (time $t_3$–time $t_2'$).

As illustrated by FIG. 11, the time at which movement of lens group 1000 is started is set at a time ($t_2'$) which is relatively close to the exposure control start time ($t_3'$). As a result, the motion control target speed 1004' and the control speed 1006' will match at time $t_3'$.

According to the above embodiments of the present invention, in the case where the target drive speed and the target drive acceleration of the lens group 1000 are large (for example, at the start of film exposure control), highly accurate motion compensation can be performed by starting the movement of lens group 1000 at a relatively large period of time before the drive speed must be obtained.

In addition, according to the above embodiments of the present invention, in the case where the target drive speed and the target drive acceleration of lens group 1000 are relatively small (for example, immediately before film exposure), highly accurate motion compensation can be performed while effectively using the controllable range of lens group 1000. To provide such motion compensation where the target drive speed and the target drive acceleration are relatively small, the movement of lens group 1000 is started at a relatively small period of time before the drive speed must be obtained.

According to the above embodiments of the present invention, the start of movement of lens group 1000 (that is, time t2) can be computed using both the target speed of movement and the target acceleration of movement of the movable member of the motion compensation device; however, the start of movement can be computed using either the target speed of movement or the target acceleration of movement. Moreover, according to the above embodiments of the present invention, the motion speed and acceleration are used as motion information to determine the starting time of the movement of the movable member; however, other motion information can be used, such as, for example, motion displacement.

According to the above embodiments of the present invention, fuzzy control is used to increase the speed of processing. computations when the target speed of movement and target acceleration of movement are obtained. However, other types of processing methods can be used, such as, for example, normal computation control.

According to the above embodiment of the present invention, a motion compensation device performs motion compensation control with high accuracy by setting the movement start time of the movable member before the start of exposure and at a desired time, in accordance with motion information. As a result, the drive speed of the movable member can be made to match or sufficiently approximate the target drive speed at the start of exposure. Moreover, according to the above embodiments of the present invention, the target speed of movement and/or the target acceleration of movement of the movable member is set, and the drive speed of the movable member is controlled to match or sufficiently approximate the target drive speed.

According to the above embodiments of the present invention, the motion compensation device performs high accuracy motion compensation control by using motion information. This motion information can be motion speed, acceleration and/or displacement. The motion compensation devices uses this information to make the drive speed of the movable member match or sufficiently approximate the target drive speed at the start of film exposure.

According to the above embodiments of the present invention, fuzzy logic control is used to drive a movable member of a motion compensation device at the appropriate timing and speed so that the moveable member movement start time and the exposure control start time are as short as possible to obtain the desired target control parameters.

According to the above embodiments of the present invention, all computations and all operational preparations of the motion compensation device are completed by the start of exposure control, to drive the movable member at the appropriate timing and speed. Motion compensation control computations are started when a motion compensation command, or activation signal, is received from the camera body.

According to the above embodiments of the present invention, the target speed of movement and/or the target acceleration of movement of the movable member is set, and the drive speed of the movable member is controlled to match or approximate the target drive speed at the start of film exposure.

According to the above embodiments of the present invention, a motion compensation device detects motion and moves part or all of a photographic optical system and a photographic image plane relative to each other, to compensate for the detected motion. More specifically, the motion compensation device compensates for the detected motion by moving, at the start of exposure, the photographic optical system and the photographic image plane relative to each other at a speed which matches or approximates the speed of the detected movement. The start of movement is set before the start of exposure and in accordance with motion information.

According to the above embodiments of the present invention, the lens device controls the speed of the motion of the movable member generated at the start of exposure control, so that the controlled speed of the movable member matches the speed of movement of the detected motion.

According to the above embodiments of the present invention, all computations and all photograph preparations of the camera (for example, mirror raising) are completed at the start of exposure control and the movable member is driven at the appropriate timing and speed in accordance with motion information. Motion compensation control computations are started when an activation command is received by the lens device from the body device to activate motion compensation.

According to the above embodiments of the present invention, an optical device, such as a camera, performs an exposure operation to expose a recording medium (such as, for example, film inside a camera). The optical device includes a movable member (for example, lens group 1000), and a control device for controlling the movable member. For example, motion compensation control microcomputer 3, motion compensation head amp 13, y-axis drive motor 11, y-axis motor driver 12, y encoder 9, y encoder IC 10, x-axis drive motor 7, x-axis motor driver 8, x encoder 5 and x encoder IC 6 together function as a control device to control the movement of lens group 1000, to compensate for motion affecting the camera. The movable member begins moving at an activation time prior to the exposure operation, and is then movable to compensate for motion affecting the optical device. The control device controls the movement of the movable member by detecting motion affecting the optical device and setting the activation time. The activation time is set so that, at the start of the exposure operation, the speed of movement of the movable member approximates the speed of movement of the detected motion. The control device can control the movement of the movable member by setting a target speed and/or a target acceleration of the movable member, so that, at the start of the exposure operation, the speed of the movable member approximates the speed of the detected motion. Further, the control device can detect motion by detecting the speed, acceleration and/or displacement of motion affecting the optical device.

As previously described for a conventional single-lens reflex camera, a brief, large amplitude motion occurs in the body device due to mirror raising shock, shutter blade running vibrations drive vibration of the film winding motor, autofocus (AF) motor drive vibration and/or electrical noise. This brief, large amplitude motion causes the motion compensation device to follow the brief, large amplitude motion. As a result, the motion compensation device cannot accurately follow and detect the motion caused by hand tremors.

Therefore, according to the following embodiments of the present invention, an interrupt signal is sent to lens device 1 from body device 2, to inhibit the drive control of the movable member (for example, lens group 1000) during brief, large amplitude motion occurring in body device 2.

Figure 12A:
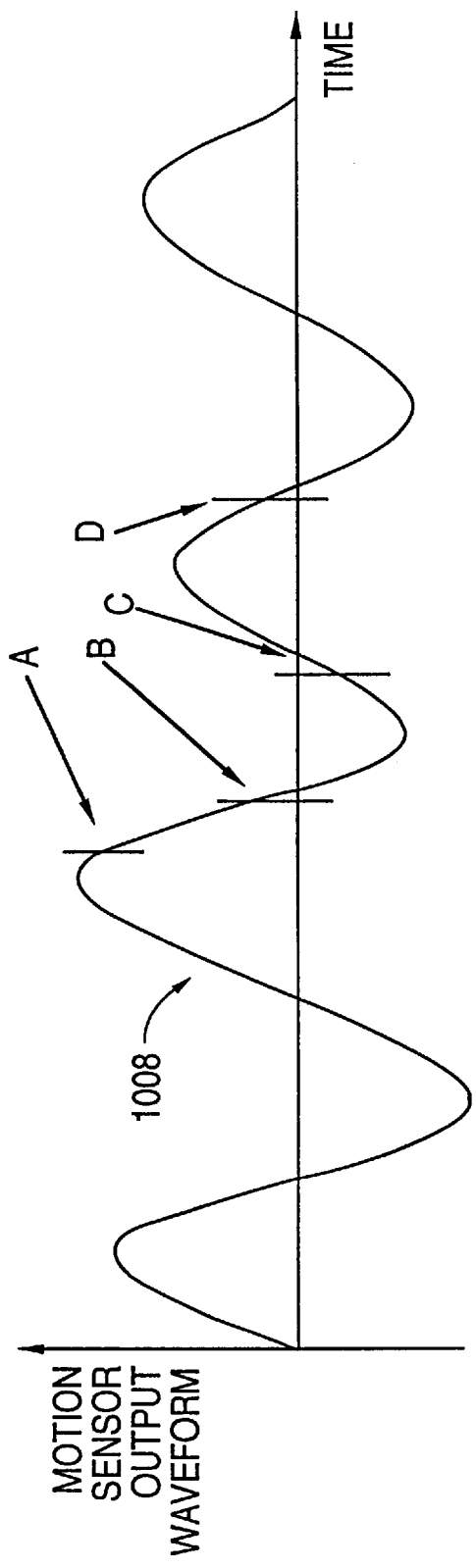
FIG. 12(A) is a graph illustrating a motion sensor output waveform in a camera having a motion compensation device, according to an embodiment of the present invention.
Figure 12B:
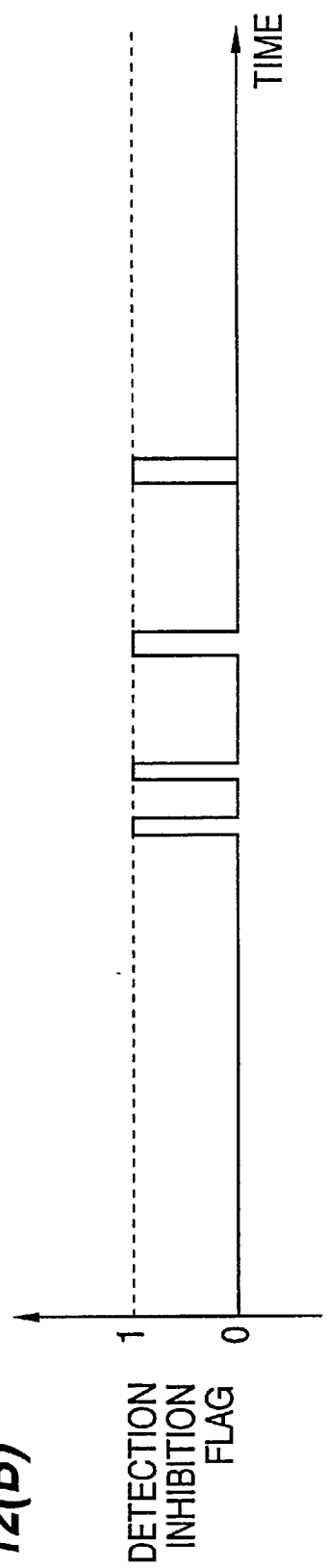
FIG. 12(B) is a graph which, together with FIG. 12(A), illustrates the timing of an interrupt signal sent to a lens device from a body device in a camera having a motion compensation device, according to an embodiment of the present invention.

FIG. 12(A) is a graph illustrating an output waveform 1008 produced by motion compensation head amp 13 (see FIG. 1), according to an embodiment of the present invention. Thus, output waveform 1008 represents the motion affecting the camera, as detected by motion compensation head amp 13. Moreover, FIG. 12(B) is a graph which, together with FIG. 12(A), illustrates the timing of an interrupt signal, sent to lens device 1 from body microcomputer 25 of body device 2, according to an embodiment of the present invention. Body microcomputer 25 preferably determines whether the interrupt signal is "1" or "0", and is typically computed in accordance with motion compensation control instructions sent to lens device 1 from body device 2.

As illustrated by FIG. 12(A), vibration or motion originating in body device 2 causes a steep oscillatory wave at points A, B, C and D on output waveform 1008. However, as illustrated by FIG. 12(B), an interrupt signal is output from body device 2 to lens device 1 at points A, B, C and D, thereby interrupting the drive control of lens group 1000 at points A, B, C and D. Therefore, the interrupt signal indicates the time during which body device 2 interrupts lens device 1.

The length of time of the interrupt signal (that is, the width of each interrupt signal pulse illustrated in FIG. 12(B)) can be set simultaneously with the issuance of the interrupt signal. The length of time of the interrupt signal corresponds to the time period in which the drive control of lens group 1000 is interrupted, and is determined in accordance with the duration of output waveform 1008 at points A, B, C and D. It is desirable to set the interruption time (that is, the width of each interrupt signal pulse in FIG. 12(B)) to be as short as possible to ensure a smooth restart of drive control after the interruption is ended.

Figure 13:
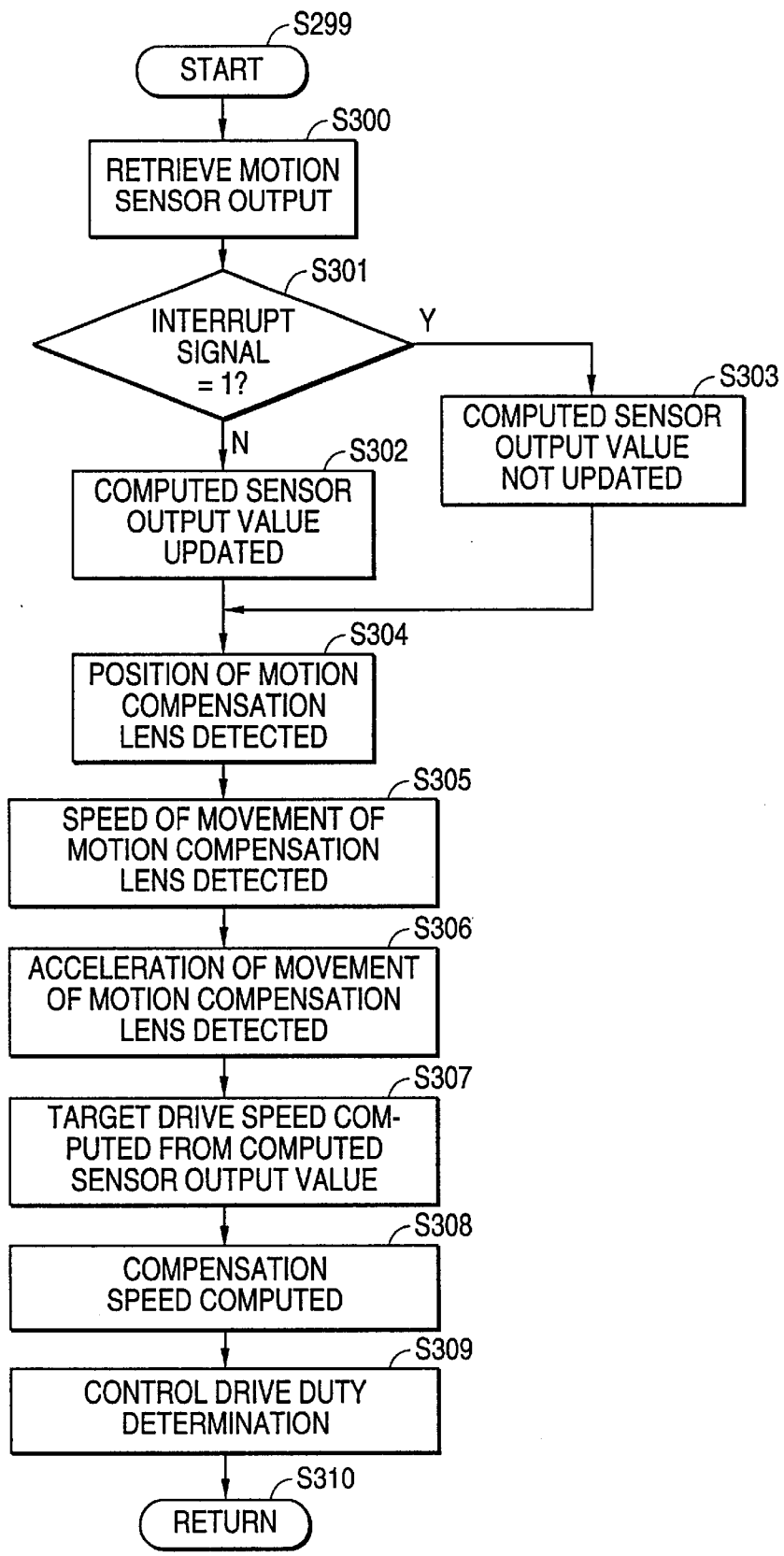
FIG. 13 is a flow chart illustrating the processing sequence of the motion compensation computations in step S207 of FIG. 3, according to an embodiment of the present invention.

FIG. 13 is a flow chart illustrating the processing sequence of the motion compensation computations in step S207 of FIG. 3, according to the present embodiment of the present invention. The process illustrated in FIG. 13 is preferably executed by motion compensation control microcomputer 3.

Referring now to FIG. 13, the process starts in step S299. From step S299, the process moves to step S300, where motion compensation control microcomputer 3 retrieves the output of motion compensation head amp 13. From step S300, the process moves to step S301, where motion compensation microcomputer 3 receives the interrupt signal from body microcomputer 25 via lens contact 4, and determines the logic value ("1" or "0") of the interrupt signal. If the interrupt signal is equal to one (1) in step S301, the process moves to step S303. If the interrupt signal is not equal to one (1) in step S301, the process moves to step S302.

In S302, the interrupt signal is not equal to one (1), therefore, it is not intended for motion compensation to be interrupted. As a result, in step S302, a sensor output value used in a control duty computation provided to x motor driver 8 and y motor driver 12 is replaced with the motion sensor output value obtained in S300. Therefore, when the interrupt signal is not equal to one (thereby indicating that body device 2 is not producing motion), lens group 1000 is driven in accordance with the output of motion compensation head amp 13. From step S302, the process moves to step S304.

In S303, the interrupt signal is equal to one (1), therefore, it is intended for motion compensation control to be interrupted. As a result, in step S303, the sensor output value used in the control duty computation provided to x motor driver 8 and y motor driver 12 is kept as the sensor output value used immediately before computation. Therefore, when the interrupt signal is equal to one (thereby indicating that body device 2 is producing motion), the motion compensation control is interrupted so that lens group 1000 is driven in accordance with the output of motion compensation head amp 13 as detected before body device 2 starts producing motion. From step S303, the process moves to step S304.

In S304, the position of lens group 1000 is detected from the product values of the pulses output from x encoder IC 6 and y encoder IC 10. From step S304, the process moves to step S305, where the speed of lens group 1000 is detected from the variations of the pulses output from x encoder IC 6 and y encoder IC 10. From step S305, the process moves to step S306, where the acceleration of lens group 1000 is detected from the differences in the variations of the pulses output from x encoder IC 6 and y encoder IC 10.

From step S306, the process moves to step S307, where the target drive speed is computed from the computed sensor output value determined in step S302 or step S303. From step S307, the process moves to step S308, where the compensation speed is computed from the position of lens group 1000 obtained in S304, the speed of movement of lens group 1000 obtained in S305, and the acceleration of movement of lens group 1000 obtained in S306.

From step S308, the process moves to step S309, where the control duty output to x motor driver 8 and y motor drive 12 is determined from the target speed obtained in S307 and the compensation speed obtained in S308. From step S309, the process moves to a return in step S310.

Therefore, motion compensation computations are performed in step S207 of FIG. 3 in accordance with the processing sequence illustrated in FIG. 13, to thereby provide high accuracy motion compensation with respect to hand motion affecting the camera.

According to the above embodiments of the present invention, an inhibition signal (that is, an interrupt signal) is transmitted from body device 2 to the attached lens device 1, and speed control of a moveable member (such as lens group 1000) built into lens device 1 is interrupted in conjunction with the occurrence of motion caused by body device 2. As a result, motion compensation control is not adjusted when detected motion includes motion caused by sources other than hand tremor.

According to the above embodiments of the present invention, speed control of the motion compensation device is performed. However, the acceleration, the displacement or a combination of acceleration and displacement of a movable member of a motion compensation device can also, or alternatively, be controlled.

According to the above embodiments of the present invention, high accuracy motion compensation can be performed since motion compensation control is interrupted only at times corresponding to the occurrence of motion resulting from sources other than hand tremor. Moreover, motion compensation control can be performed without discontinuity in the movement of a movable member of a motion compensation device since, when motion compensation control is interrupted, the movable member moves at the previous speed of movement immediately before the start of interruption.

According to the above embodiments of the present invention, a motion compensation device compensates for detected motion by changing the optical axis of a motion compensation optical system (which includes part of all of the photographic optical system), based on the detected motion. The control of the motion compensation device is interrupted when motion occurs which originates in the camera.

According to the above embodiments of the present invention, the movement of a moveable member of a motion compensation device is controlled so that the movable member accurately follows only the motion resulting from hand tremors. Therefore, control of the motion compensation device is interrupted when motion occurs from sources other than hand tremor (for example, from mirror raising shock, shutter bland running vibration, drive vibration of film, AF motor drive vibration and/or electrical noise).

According to the above embodiments of the present invention, the motion compensation device accurately follows only motion resulting from hand tremor, since control of the motion compensation device is interrupted at times corresponding to motion from other sources.

According to the above embodiments of the present invention, motion compensation control is smoothly performed without the movable member of a motion compensation device being required to move unnecessarily before or after interruption. Moreover, the movable member moves without discontinuity since, during an interruption, the movable member continues to be moved at the same speed of movement at which the moveable member was moving at the start of the interruption.

According to the above embodiments of the present invention, an optical device, such as a camera, includes a movable member, an interrupt signal unit and a control device. The movable member (for example, lens group 1000) is movable to compensate for motion affecting the optical device. The interrupt signal unit (for example, body microcomputer 25) produces an interrupt signal indicating when motion affecting the optical device originates in the optical device. The control device (a) detects motion affecting the optical device, (b) controls the movement of the movable member to compensate for the detected motion and, when the interrupt signal indicates that motion affecting the optical device originates in the optical device, (c) adjusts the movement of the movable member in accordance with the motion originating in the optical device. For example, motion compensation control microcomputer 3, motion compensation head amp 13, y-axis drive motor 11, y-axis motor driver 12, y encoder 9, y encoder IC 10, x-axis drive motor 7, x-axis motor driver 8, x encoder 5 and x encoder IC 6 together function as a control device to control the movement of lens group 1000, to compensate for motion affecting the camera.

Further, according to the above embodiments of the present invention, when the interrupt signal indicates that motion affecting the optical device originates in the optical device, the control device controls the movable member to continue moving at the speed at which the movable member was moving immediately before the interrupt signal indicated that motion affecting the optical device originated in the optical device.

According to the above embodiments of the present invention, motion compensation control microcomputer 3, motion compensation head amp 13, y-axis drive motor 11, y-axis motor driver 12, y encoder 9, y encoder IC 10, x-axis drive motor 7, x-axis motor driver 8, x encoder 5 and x encoder IC 6 together function as a control device to control the movement of lens group 1000, to compensate for motion affecting the camera. However, this is only an example of a control device. The control device can include less than these components, more than these components, or different components. The motion compensation control microcomputer 3, taken by itself, can be considered to be the control device, since the other components gather the information, but the motion compensation control microcomputer 3 is the device which actually performs the computations and controls all the other components.

According to the above embodiments of the present invention, motion compensation microcomputer 3 and ultrasonic motor microcomputer 16 are both a part of lens device 1; however, motion compensation microcomputer 3 and/or ultrasonic motor microcomputer 16 can instead be a part of body device 2. However, designing motion compensation microcomputer 3 and ultrasonic motor microcomputer 16 to be a part of lens device 1 is advantageous from the standpoint of performing optimum motion compensation control, which differs according to the size of lens device 1. Moreover, the various microprocessors can be designed as separate processors or as a single processor which performs multiple functions. Also, the placement of the various microprocessors in a camera can easily be changed by a person of skill in the-art.

In the above embodiments of the present invention, a camera is described as being a single-lens reflex camera having a lens device attachable to a body device. However, the present invention can be applied to other types of camera, including compact cameras having a lens section inside the body of the camera.

Further, the present invention is described as relating to a camera. However, the present invention is not intended to be limited to a camera. For example, the present invention can be used in many types of optical devices including, but not limited to, camcorders, motion picture cameras, telescopes, binoculars, microscopes, range finding equipment, lasers, fiber optic communication systems, various optical projection systems and CD mastering systems.

The present invention is described as relating to an optical device which performs an exposure operation to expose a recording medium. However, the recording medium can be in many different forms, depending on the optical device in which the present invention is applied. For example, the recording medium can be film. Moreover, the recording medium can be a digital recording medium, such as an optical disk or a CCD sensor. Also, the recording medium can be the eye of a person looking through an optical device. For example, if the present invention is applied to binoculars, the recording medium would be the eye of a person looking through the binoculars.

The present invention is also described as relating to an "exposure operation" to expose a recording medium. Typically, the exposure operation is the exposure of a recording medium in a camera or other such photographic device. However, such an "exposure operation" can be in many different forms, depending on the optical device in which the present invention is applied. Thus, the present invention is not intended to be limited to a photographic exposure operation. For example, the "exposure operation" can be the exposing of a person's eye looking through binoculars to light from a subject being viewed through the binoculars.

According to the above embodiments of the present invention, a movable member of a motion compensation device is described as being a lens group (for example, lens group 1000). However, the movable member is not intended to be limited to a lens group. The movable member can be any device which is movable to compensate for motion. For example, in a camera or in binoculars, the total optical system (not simply one lens or lens group which is part of the total optical system) may be moveable, or the entire lens device may be movable. Thus, the entire photographic optical system and/or the lens group in a camera can be the movable member. Also, the image plane may be movable to compensate for motion. Thus, the image plane can be the movable member. For example, the recording medium may be movable to compensate for motion affecting the optical device.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical device comprising:
   a movable member which is movable to compensate for motion affecting the optical device;
   an interrupt signal unit producing an interrupt signal when motion affecting the optical device is originated by the optical device; and
   a control device detecting motion affecting the optical device, controlling the movement of the movable member to compensate for the detected motion and, when the interrupt signal is produced, adjusting the movement of the movable member in accordance with the motion originated by the optical device.

2. An optical device as in claim 1, wherein, when the interrupt signal is produced, the interrupt signal interrupts the movement of the movable member by the control device.

3. An optical device as in claim 1, wherein, when the interrupt signal is produced, the control device controls the movement of the movable member so that the movable member continues to move at the speed of movement at which the movable member was moving immediately before the interrupt signal indicated that motion affecting the optical device was originated by the optical device.

4. An optical device as in claim 1, wherein the optical device is a camera having a lens device attached thereto, and the control device is inside the lens device.

5. An optical device as in claim 4, wherein, when the interrupt signal is produced, the interrupt signal interrupts the movement of the movable member by the control device.

6. An optical device as in claim 4, wherein, when the interrupt signal is produced, the control device controls the movement of the movable member so that the movable member continues to move at the speed of movement at which the movable member was moving immediately before the interrupt signal indicated that motion affecting the optical device was originated by the optical device.

7. An optical device as in claim 1, wherein the movable member moves in directions perpendicular to the optical axis of the optical device, to compensate for motion affecting the optical device.

8. A camera comprising:

a movable member which is movable in direction perpendicular to the optical axis of the camera, to compensate for motion affecting the camera;

an interrupt signal unit producing an interrupt signal when motion affecting the camera is originated by the camera; and a control device detecting motion affecting the camera, controlling the movement of the movable member to compensate for the detected motion and, when the interrupt signal is produced, controlling the movement of the movable member so that the movable member continues to move at the speed of movement at which the movable member was moving immediately before the interrupt signal indicated that motion affecting the camera was originated the camera.

9. An optical device comprising:

a movable member which is movable to compensate for motion affecting the optical device; and a control device detecting motion affecting the optical device, controlling the movement of the movable member to compensate for the detected motion and, when motion affecting the optical device is originated by the optical device, controlling the movement of the movable member so that the movable member continues to move at the speed of movement at which the movable member was moving immediately before the motion affecting the optical device was originated by the optical device.

* * * * *